(12) United States Patent
Gordon et al.

(10) Patent No.: US 9,719,025 B2
(45) Date of Patent: *Aug. 1, 2017

(54) FLOW-THROUGH CAVITATION-ASSISTED RAPID MODIFICATION OF CRUDE OIL

(71) Applicant: Cavitation Technologies, Inc., Chatsworth, CA (US)

(72) Inventors: Roman Gordon, Studio City, CA (US); Igor Gorodnitsky, Marina del Rey, CA (US); Maxim A. Promtov, Tambov (RU)

(73) Assignee: Cavitation Technologies, Inc., Chatsworth, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/531,867

(22) Filed: Nov. 3, 2014

(65) Prior Publication Data

US 2015/0053545 A1    Feb. 26, 2015

Related U.S. Application Data

(63) Continuation of application No. 12/605,818, filed on Oct. 26, 2009, now Pat. No. 8,894,273, which is a
(Continued)

(51) Int. Cl.
*C10G 9/00* (2006.01)
*C10G 11/00* (2006.01)
(Continued)

(52) U.S. Cl.
CPC ............ *C10G 11/00* (2013.01); *B01J 19/087* (2013.01); *B01J 19/088* (2013.01); *B01J 19/10* (2013.01);
(Continued)

(58) Field of Classification Search
CPC .......... C10G 9/00; C10G 9/007; C10G 1/047; C10G 1/00; C10G 15/00
See application file for complete search history.

(56) References Cited

U.S. PATENT DOCUMENTS 3,364,859 A * 1/1968 Bodine ................... E21B 28/00
417/241
3,474,596 A * 10/1969 Scheuerman ........... E21B 43/00
208/106
(Continued)

FOREIGN PATENT DOCUMENTS

RU    2143312 C1    6/1997
RU    2126117 C1    11/1997
(Continued)

OTHER PUBLICATIONS

Lin, Jiunn-Ren and Yen, Teh Fu. "An Upgrading Process through Cavitation and Surfactant." Energy & Fuels (1993) 7 111-118.
(Continued)

*Primary Examiner* — Michelle Stein
(74) *Attorney, Agent, or Firm* — Kelly & Kelley, LLP

(57) ABSTRACT

A device and method are provided for manipulating petroleum, non-conventional oil and other viscous complex fluids made of hydrocarbons that comprise enforcement of fluid in a multi-stage flow-through hydrodynamic cavitational reactor, subjecting said fluids to a controlled cavitation and continuing the application of such cavitation for a period of time sufficient for obtaining desired changes in physical properties and/or chemical composition and generating the upgraded products. The method includes alteration of chemical bonds, induction of interactions of components, changes in composition, heterogeneity and rheological characteristics in order to facilitate handling, improve yields of distillate fuels and optimize other properties.

19 Claims, 9 Drawing Sheets

Related U.S. Application Data continuation-in-part of application No. 12/395,110, filed on Feb. 27, 2009, now Pat. No. 7,762,715, and a continuation-in-part of application No. 12/464,646, filed on May 12, 2009, now Pat. No. 8,042,989.

(51) Int. Cl.

| | |
|---|---|
| C10G 15/08 | (2006.01) |
| C10G 31/00 | (2006.01) |
| C10G 31/06 | (2006.01) |
| B01J 19/08 | (2006.01) |
| B01J 19/10 | (2006.01) |
| B01J 19/12 | (2006.01) |
| C10G 1/00 | (2006.01) |
| C10G 11/05 | (2006.01) |
| C10G 11/14 | (2006.01) |

(52) U.S. Cl.
CPC .......... *B01J 19/123* (2013.01); *C10G 1/002* (2013.01); *C10G 9/007* (2013.01); *C10G 11/05* (2013.01); *C10G 11/14* (2013.01); *C10G 15/08* (2013.01); *C10G 31/00* (2013.01); *C10G 31/06* (2013.01); *B01J 2219/08* (2013.01); *B01J 2219/085* (2013.01); *B01J 2219/0849* (2013.01); *B01J 2219/0877* (2013.01); *B01J 2219/1203* (2013.01)

(56) References Cited

U.S. PATENT DOCUMENTS

| | | | |
|---|---|---|---|
| 4,411,770 A | 10/1983 | Chen et al. | |
| 5,492,654 A * | 2/1996 | Kozjuk | B01F 5/0656 |
| | | | 261/76 |
| 5,914,027 A * | 6/1999 | Ellingsen | B01J 8/10 |
| | | | 208/107 |
| 5,969,207 A | 10/1999 | Kozyuk | |
| 5,971,601 A | 10/1999 | Kozyuk | |
| 6,200,486 B1 | 3/2001 | Chahine et al. | |
| 6,227,694 B1 | 5/2001 | Mitake et al. | |
| 6,502,979 B1 | 1/2003 | Kozyuk | |
| 6,544,411 B2 | 4/2003 | Varadaraj | |
| 6,705,396 B1 | 3/2004 | Ivannikov et al. | |
| 6,979,757 B2 | 12/2005 | Powers | |
| 7,207,712 B2 | 4/2007 | Kozyuk | |
| 7,247,244 B2 | 7/2007 | Kozyuk | |
| 7,338,551 B2 | 3/2008 | Kozyuk | |
| 2006/0231462 A1* | 10/2006 | Johnson | C10G 9/00 |
| | | | 208/125 |
| 2007/0189114 A1 | 8/2007 | Reiner et al. | |
| 2007/0253874 A1 | 11/2007 | Foret | |
| 2008/0217211 A1* | 9/2008 | Chornet | C10G 9/007 |
| | | | 208/106 |

FOREIGN PATENT DOCUMENTS

| | | |
|---|---|---|
| RU | 2158627 C1 | 3/1999 |
| WO | WO/2005/042178 | 5/2005 |

OTHER PUBLICATIONS

Tao, R and Xu, X. "Reducing the Vixcosity of Crude Oil by Pulsed Electric or Magnetic Field." Energy & Fuels (2006) 20 2046-2051.
Gogate, Paul. "Cavitational reactors for process intensification of chemical processing applications: A critical review." Chemical Engineering and Processing (2008) 47 515-527.

* cited by examiner

Effect of hydrodynamic flow-through cavitation
on bromine number of heavy oil
(API gravity 14.5 at 60° F)

| Type of oil | Bromine number | Increase in bromine number, % |
|---|---|---|
| Non-treated | 11.39 | |
| After 15-min cavitation | 12.06 | 5.9 |
| Mixed with chelating raegent and water and cavitated for 15 min | 13.24 | 16.2 |

Effect of hydrodynamic flow-through cavitation on selected properties of heavy oil

| Parameters | Non-treated | 1-min cavitation | 10-min cavitation |
|---|---|---|---|
| Temperature, °F | 107 | 135 | X |
| API gravity at 60 °F | 14.5 | 16.5 | 18.5 |
| Difference between and point (EP) and initial boiling point (IBP) | 612 | NA | 602 |

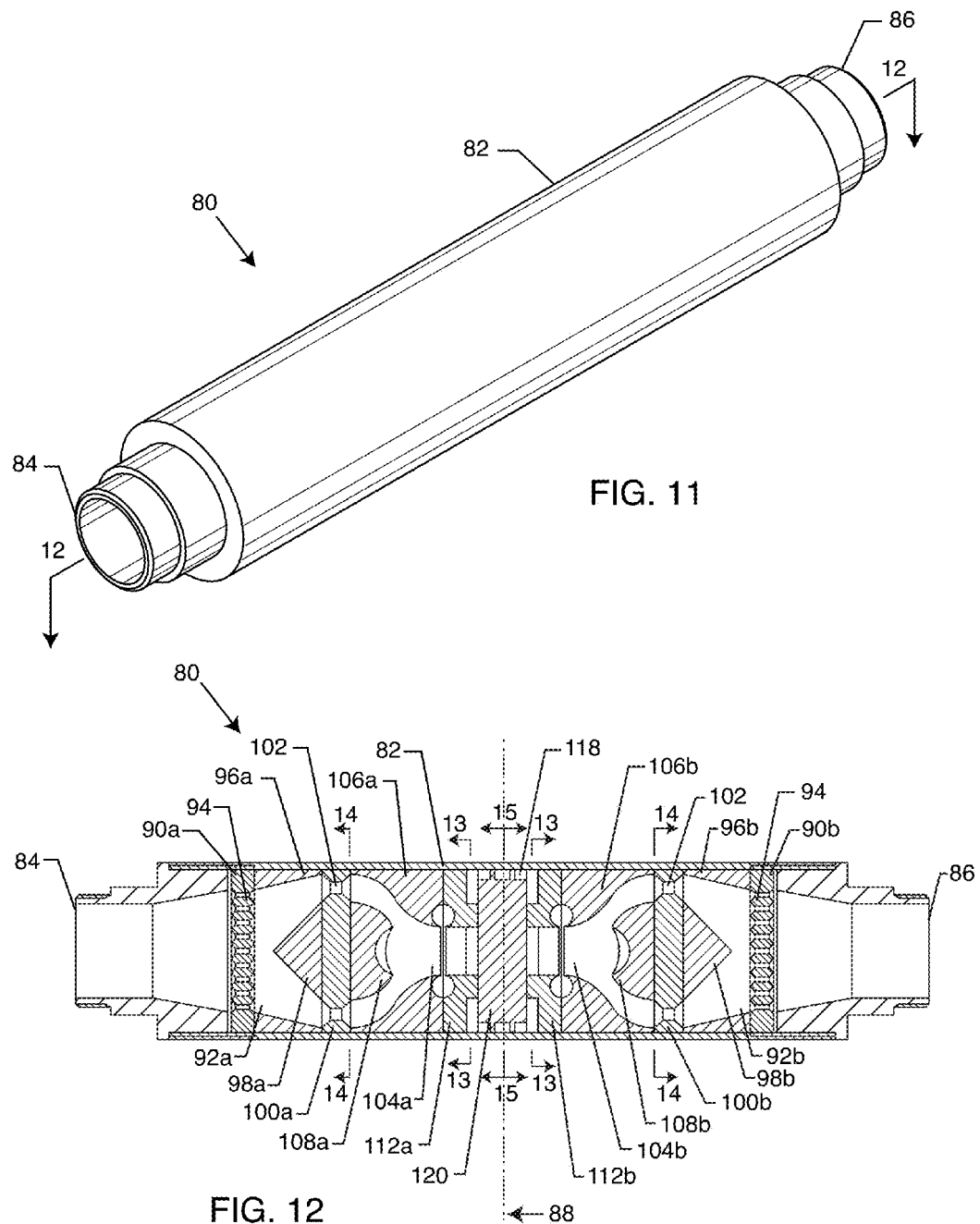

FLOW-THROUGH CAVITATION-ASSISTED RAPID MODIFICATION OF CRUDE OIL

RELATED APPLICATION

This application is a continuation of U.S. application Ser. No. 12/605,818, filed Oct. 26, 2009, which application is a continuation-in-part of U.S. application Ser. No. 12/395,110, filed Feb. 27, 2009, and Ser. No. 12/464,646, filed May 12, 2009.

BACKGROUND OF THE INVENTION

The invention relates generally to the controlled formation of cavitation bubbles that serve as autonomous chemical mini-reactors and use the energy released during implosion of these bubbles to rapidly alter complex hydrocarbon mixtures.

More particularly, the invention relates to modification of conventional and non-conventional oil by a flow-through hydrodynamic cavitation and utilizes cavitation bubble energy for improving homogeny, viscosity, API (American Petroleum Institute) gravity and other physical properties. This invention may find applications in the oil/fuel industry and synthetic chemistry Moreover, the present invention relates to a method that subjects petroleum, liquefied shale oil and complex mixtures of hydrocarbons to flow-through hydrodynamic cavitation for a period of time sufficient for alteration of chemical composition, conversion of compounds, obtaining upgraded product with higher yield of distillate fuels.

Oil is a naturally occurring non-renewable source of energy. Similar to other fossil fuels, such as coal and natural gas, it formed from the fossilized remains of plants and animals. Over millions of years, the decay has been translocating into the Earth's crust, where it transformed into oil under heat and pressure.

Apart from conventional oil, produced by the traditional well method, non-conventional oil is produced by very different methods. Sources of non-conventional oil include among others tar sands (oil sand), oil shale and heavy oil. The extraction of oil from sands requires either strip mining or in situ processing with steam and caustic soda. The shale oil contains kerogen, which can be converted into fuels. It was estimated that only 30% of the shale oil deposits meet the economic requirement of 25 gallons of oil per 1 ton of shale, of which only 15% is presently recoverable. The refinement of shale oil is very difficult and requires large quantities of gas and water, which negatively affects its economic value. Heavy oils are very viscous, ranging from heavy molasses to solids at ambient temperature and cannot be transported and refined by conventional methods. They may contain high levels of sulfur, trapped gases and heavy metals and possess a specific gravity similar to that of water.

Oil is a non-uniform fluid and consists of heavy compounds dispersed in light crude, ranging from straight and branched chain and cyclic saturated and unsaturated hydrocarbons to complex aromatics and asphalt (bitumen). Bitumen is usually called the hydrocarbon content of heavy oils and tar sand deposits. It is black, highly viscous, sticky, and soluble in carbon disulfide.

Asphalt is a colloid, with asphaltenes as the dispersed phase and maltenes as the continuous phase. Asphaltenes consist of condensed aromatics with side chains up to $C_{30}$, hetero-aromatics with sulfur in benzothiophene rings, nitrogen in pyrrole and pyridine rings, polyfunctional molecules with sulphur, nitrogen and oxygen in the chemical groups such as, for example, thiol, amino and keto, hydroxyl, and carboxylic, correspondingly, and porphyrin-complexes of nickel and vanadium. Maltenes are soluble in n-alkanes (pentane or heptane). They contain straight or branched chain saturated hydrocarbons (saturates), cyclic saturated hydrocarbons (cycloalkanes or naphthenes), resins (smaller analogs of asphaltenes), heteroaromatics of oxygen, nitrogen and/or sulfur (first acidaffins), and straight and branched chain and/or cyclic unsaturated hydrocarbons (olefins, second acidaffins).

Petroleum heavy crudes and residues are suspensions of asphaltene colloids stabilized by resins. The smallest colloid particles that are 2-4 nm in diameter form clusters (asphaltene micelles) with a size of 10-30 nm. Further aggregation leads to the formation of flocs and macrostructures (Evdokimov et al., 2001). Thus, conventional and non-conventional oil are non-Newtonian fluids.

Although the mechanical behavior of fluids is characterized by a constant viscosity, this approach inadequately describes non-Newtonian fluids. The relation between the shear stress and the strain rate of such fluids is nonlinear and often time-dependent. Although a constant coefficient of viscosity cannot be defined for a non-Newtonian fluid, it is possible to define a ratio between shear stress and rate of strain, a shear-dependent viscosity, especially for fluids with no time-dependent behavior. Non-Newtonian fluids are studied by measuring rheological properties and the continuum mechanics calculations.

Since hydrocarbons of different molecular weights and structures boil at different temperatures, crude oil is traditionally separated into fractions via fractional distillation, which has become the main refining technique. The residual heaviest fraction obtained by fractional distillation is called refined bitumen. It boils at 525° C. Oil fractionation is conducted at elevated temperatures and pressures in the presence of hydrogen or steam and zeolite catalysts, which require continuous regeneration. Fluid catalytic cracking (FCC) is the most efficient process for oil upgrading in industrial practice, but high temperature (400-500° C.) and pressure (up to 100 atm) are both required. The harsh conditions and safety considerations place constraints and limitations on refinery's material. These methods are expensive and energy consuming.

Because FCC does not open the aromatic structures, bitumen-derived heavy vacuum distillate or vacuum gas oil (VGO) are poor feedstocks. At the present time, upgrading of bitumen, which is composed primarily of highly condensed polycyclic aromatics and exhibits high heterogeneity and stability, is extremely costly. To increase yield of gasoline, multi-ring aromatic compounds are to be saturated to single-ring aromatics in a feed pretreater. Hydrogen added after this step lowers both gasoline yield and octane number.

Distillate fuels such as gasoline, turbo-jet fuel, and diesel fuel are used in internal combustion engines to convert chemical energy and heat into mechanical energy. Gasoline is a fuel designed for the Otto-cycle 4-stroke engine. It contains hydrocarbons with a carbon number ranging from 4 to 10 (C4-C10). Other distillate fuels include diesel, kerosene, turbo-jet fuel, and heating oil. Diesel has a lower boiling point than gasoline and is less costly in production. Instead of spark plugs, the diesel engine relies on compression and the heating of air to cause ignition. However, high levels of contaminants in engine exhaust gas require diesel fuel to undergo additional purification by filtration, driving its cost up. As with FCC, the methods for upgrading oil and complex hydrocarbon mixtures are performed at high temperature and pressure in the presence of catalysts that must be constantly regenerated. These methods are highly expensive and energy consuming.

It has been reported that elevated pressure and increased temperature supplied by acoustic and hydrodynamic cavitation activate many processes and accelerate a number of chemical reactions. The formation of bubbles in a fluid is easy to observe, when its temperature approaches the boiling point. An increase in the hydrostatic pressure of a fluid will suppress the formation of bubbles. If the fluid is subjected to a sound wave treatment or passes through a hydrodynamic cavitation reactor at a proper velocity, cavitation bubbles form as a result of a decrease in fluid pressure (Bernoulli's principle). The concentration of cavitation bubbles reaches hundreds in a cubic centimeter of the cavitated fluid.

Once the bubbles are created, they can remain stationary restricting the flow and taking up space normally occupied by the fluid. This causes a resistance to the flow and increases the pressure. If the bubbles move and relocate into a high pressure zone, they will implode (reversed Bernoulli's principle) within $10^{-8}$-$10^{-6}$ seconds, resulting in a drastic increase in both pressure (~1,000 atm) and temperature (~5,000° C.), and formation of local jet streams with the velocities of 100 m/s and higher (Suslick, 1989; Didenko et al., 1999; Suslick et al., 1999; Young 1999). The sudden collapse releases a significant amount of energy in the form of shock wave, vigorous shearing forces, and localized heating, which either initiate chemical reactions and processes or dissipate into the surrounding fluid. These activate gas phase molecules located in the bubbles and in the surrounding liquid and initiate chemical reactions. In some cases, cavitation bubble implosion is accompanied by emission of ultraviolet and/or visible light making it possible for photochemical reactions to proceed.

The formation of large molecular matrices, arrays and pseudo-polymeric systems play an important role in oil processing, resulting in its high surface tension and viscosity, and non-Newtonian behavior. Any disruption of these large molecular associations, particles, agglomerates or pseudo-polymeric interactions leads to alteration of oil properties.

The cavitation phenomenon is categorized by the dimensionless cavitation number $C_v$, which can be mathematically represented as: $C_v=(P-P_v)/0.5\rho V^2$, where P is the recovered pressure downstream of a constriction, $P_v$ is the vapor pressure of the fluid, V is the average velocity of the fluid at the constriction, and $\rho$ is the fluid density. The cavitation number, at which cavitation starts, is called cavitation inception number $C_{vi}$. Ideally, the cavitation starts at $C_{vi}=1$, and there are significant cavitational effects at $C_v$ less than 1 (Gogate, 2008; Passandideh-Fard and Roohi, 2008). Another important term is the processing ratio, which is the number of cavitation events in a unit of flow.

While extreme pressure or tremendous heat can be disadvantageous, the outcome of the controlled treatments is often highly beneficial. Lin and Yen (1993) carried out cracking of asphaltenes, which are refractory for FCC and deactivate catalysts even in mild conditions, using ultrasound cavitation, sodium borohydride as a hydrogen source, and a surfactant to prevent recombination and disproportionation of asphaltene radicals. The hydrogen radicals terminated the free radical reactions and saturated olefins. As a result, 35% asphaltenes were converted into gasoline and resins in 15 min. Conversion of asphaltenes into lighter hydrocarbons increased by 10 times.

One disadvantage of sound wave cavitation technology is its batch environment. This technology cannot be efficiently used in a continuous flow process because the energy density and the residence time would be insufficient for the high production output. For example, the intensity threshold of ultrasound cavitation in water is above 0.3 W/cm². Sound wave cavitation technology suffers from a number of other drawbacks. Since the effect diminishes with an increase in distance from the soundwave source, the treatment efficacy depends upon container size, i.e., it is lower in large vessels. In addition, alterations in fluid are not uniform throughout the fluid and occur at certain locations, depending on the soundwave frequency and interference patterns. Thus, the efficacy of sound cavitation treatment is further reduced. While the previous uses of cavitation provided by sound waves in acoustic (20 Hz-20 KHz) and in ultrasonic (>20 KHz) ranges claim to improve the oil refining yield, they do not offer an optimized method for producing improved fuels.

It has been reported that both physical and chemical properties of petroleum products can be altered by subjecting them to cavitation in a pulsed rotor unit (Promtov, 2008). The treatment improves the quality of fuels.

It is known that cavitation can be created in fluids by means of various hydrodynamic devices. See, for example, U.S. Pat. No. 6,705,396 to Ivannikov et al., U.S. Pat. Nos. 7,207,712, 6,502,979 and 5,971,601 (Kozyuk) which all describe hydrodynamic cavitation devices and their uses. U.S. Pat. No. 7,338,551 to Kozyuk discloses a device and method for generating bubbles in a fluid that passes through a first local constriction of a hydrodynamic cavitation device at a velocity of at least 12 m/sec and is then mixed with a gas to enhance implosion.

According to the invention of U.S. Pat. No. 6,227,694 to Mitake et al. two or more substances are reacted through the collision of a jet flow of one reactive substance against a jet flow of another substance at the velocities of 4 m/sec or higher followed by furious turbulence and cavitation. To cause a uniform reaction within a short time, the substances are introduced from different passages and collided against each other at high flow rates. This method is advantageous for producing dispersions of submicron-sized particles.

The cavitation phenomenon is more dramatic in viscous fluids. If oil flow moves at a high speed causing the absolute pressure of the oil to drop below the vapor pressure of hydrocarbon(s) contained in it, cavitation takes place. Cavitation separates the "liquid" phase (high-boiling-point hydrocarbons and their particles in liquid hydrocarbons) from gases that are within the oil (entrapped gases, water vapor and vapors of the affected hydrocarbons). Small particulates and impurities serve as the nuclei for the cavitation bubbles that vary in size from 100 nm to a few millimeters in diameter.

U.S. Pat. No. 6,979,757 to Powers describes a method for utilizing whole crude oil as a feedstock for the pyrolysis furnace of an olefin production plant, wherein the preheated feedstock is subjected to mild thermal cracking assisted with controlled cavitation until substantially vaporized, the vapors being subjected to severe cracking in the radiant section of the furnace.

Another cavitation-based approach illustrated in U.S. Pat. No. 5,969,207 to Kozyuk uses a flow-through passage accommodating a baffle body that generates a hydrodynamic cavitation with the degree of cavitation of at least one to initiate chemical transformations and change qualitative and quantitative composition of liquid hydrocarbons. Microcracking of only liquid hydrocarbons results from the collapse of cavitation bubbles within a hydrodynamic cavitation field that changes the qualitative and quantitative composition of the mixture of only liquid hydrocarbons without using catalyst.

Oils and fuels often contain microorganisms that degrade their constituents, multiply and become an issue, especially in marine transportation. There are many technologies for sterilization of liquids, such as heating, autoclaving, treatment with antibiotics, disinfection with chlorine, ozone, permanganate and other reagents, filtration, sorption, ultraviolet and X-ray irradiation. However, most of these technologies are not applicable to oil and petroleum-related products. For instance, UV-disinfection of fluids is strongly dependent upon the uniform exposure of the target species. Due to the high opacity and shading effect of suspended particulates UV-sterilization usually exhibits low potency in oils. Uniform exposure can be achieved in a UV shockwave reactor equipped with an inner rotor with surface cavities surrounded by a quartz housing. Such device increases irradiation dose from 97 $J/m^2$ at 0 rpm to 742 $J/m^2$ for speeds above 2,400 rpm (Milly et al., 2007a; Milly et al., 2007b). Although the rotor cavitation may inactivate bacteria, bacterial spores, yeast, and yeast ascospores, its lethality strongly depends on the speed of the rotor and can be improved by preheating of fluid instead of increasing pump pressure.

U.S. Pat. No. 6,200,486 to Chahine et al. discloses another application of cavitation for quality control of fluids. This approach utilizes cavitation in shear zones associated with the jet nozzle to reduce contaminants in liquids. The jet-induced cavitation triggers chemical reactions (oxidation and reduction), which leads to decomposition and destruction of contaminants and unwanted microorganisms.

Yet another U.S. Pat. No. 7,247,244 to Kozyuk describes a process and device for lowering the level of organics in fluids with the help of oxidizing agents that are introduced into a local constriction in a flow-through chamber. Implosion of cavitation bubbles, which contain and/or are associated with the oxidizing reagents, can be accompanied by emission of ultraviolet light, ionization, generation of hydroxyl radicals, and accelerated decomposition and/or oxidation of the organic matter.

At the present time, with energy costs rising rapidly, it is highly desirable to shorten processing times and lower energy consumption to secure as large a profit margin as possible. However, the prior art techniques do not offer the most efficient method of upgrading non-Newtonian fluids in the shortest amount of time possible.

A need, therefore, exists for an advanced method and a flow-through system of conventional and non-conventional oil treatment and hydrocarbon mixture processing, with a minimal time treatment and energy cost, resulting in products with improved characteristics that can be refined with a higher distillate fuel yield and are easier to handle.

The advanced, compact, and highly efficient device is particularly desirable at mining locations and at refineries, where throughput is key. The present invention provides such a method and a device while delivering upgraded products within short time.

SUMMARY OF THE INVENTION

In accordance with the present invention, the method of the fast hydrocarbon mixture modification comprises pumping a fluid in a channel provided with a local constriction of the flow-through hydrodynamic multi-stage cavitation device with the controlled inlet pressure and using reagents and conditions of choice.

The present invention is directed to a process for the modification of crude oil, such as bitumen, asphalt, maltenes or petroleum heavy crude. The process begins with combining the crude oil with water and a catalyst such as a zeolite to create a fluidic crude oil. This fluidic crude oil is then pumped through a flowpath in a multi-stage, flow-through, hydrodynamic cavitation device. The fluidic crude oil is preferably pumped at a controlled inlet pressure approximating ambient pressure.

Within the flowpath, localized zones of reduced fluid pressure are generated in the fluidic crude oil. The flowpath preferably has a series of chambers with varying diameters and static elements to create sudden reductions in fluid pressure as the fluidic crude oil flows through the flowpath.

Cavitation features are created in these localized zones of reduced fluid pressure. These cavitation features comprise cavitation bubbles that contain vapors of volatile components in the fluidic crude oil. The cavitational features are then collapsed to expose components of the fluidic crude oil to sudden, localized increases in temperature and pressure. During this collapse, the vapors of the volatile components in the cavitational bubbles are mixed with adjacent layers of condensed fluidic crude oil, transiently enriched with less volatile components of the fluidic crude oil. This exposure and mixing induces chemical reactions between components in the fluidic crude oil to promote molecular rearrangement of the components and modify rheological parameters of the fluidic crude oil, such as viscosity, API gravity, and heterogeneity.

The process may further comprise the step of pumping the fluidic crude oil through multiple cavitation devices arranged in series and/or parallel. The fluidic crude oil may be combined with solvents and/or surfactants to lower the viscosity of the fluidic crude oil to make it flow easier. In addition, the fluidic crude oil may be exposed to a pulsed electrical/magnetic field or pre-heated to lower the viscosity of the fluidic crude oil. Further, the fluidic crude oil may be exposed to UV light irradiation or sonic irradiation before, during or after the creation of the cavitational features to further create cavitational features.

Accordingly, besides the objects and advantages of the fast oil upgrading described above, several objects and advantages of the present inventions are:

(1) to provide a continuous flow method for oil upgrading in a dramatically expedited manner with optimized energy costs;
(2) to provide a method for manipulating viscous mixtures of hydrocarbons by processing them at ambient temperature and pressure;
(3) to provide a flexible method for manipulating viscous mixtures of hydrocarbons at the site of mining;
(4) to provide a method for altering the compounds contained in non-conventional oil or other viscous complex hydrocarbon dispersions to obtain changes resembling cracking;
(5) to induce even cavitation throughout fluid volumes and for a duration sufficient to form new stable molecules and produce desired changes in other properties;
(6) to provide a method for optimizing energy usage through coupling a multi-stage, flow-through cavitation device with UV light irradiation and catalysis using the metal ions naturally present in oil;
(7) to provide a method for manipulating oil, comprising subjecting oil to a multi-stage, flow-through hydrodynamic cavitation process and continuing the repeated application of said cavitation for a time sufficient to produce product with improved viscosity and API gravity;

(8) to provide a method wherein the application of a multi-stage, flow-through hydrodynamic cavitation process is optimized to selectively modify oil constituents and produce new compounds via affecting covalent, ionic, hydrogen and/or other bonds;

(9) to provide a method, wherein cavitation is carried out in a closed system filled with ozone, nitrogen, carbon dioxide, hydrogen or other gas or a mixture thereof;

(10) to provide a method, wherein sound irradiation is applied by at least one source before or after the flow-through hydrodynamic cavitation to improve the potency of treatment;

(11) to provide a method, wherein the application of a flow-through hydrodynamic cavitation is used to destroy or slow down growth of yeast and bacteria present in oil and fuel;

(12) to provide a method, wherein two or more multi-stage, flow-through hydrodynamic cavitation reactors are employed;

(13) to provide a method, wherein the multi-stage flow-through hydrodynamic cavitation is applied to oil at ambient temperatures, or to heated or cooled oil.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 11 is a perspective view another preferred embodiment of the inventive multi-stage cavitation device.

FIG. 12 is a cross-sectional view taken along line 12-12 of FIG. 11.

DETAILED DESCRIPTION OF THE PREFERRED EMBODIMENTS

Figure 1:
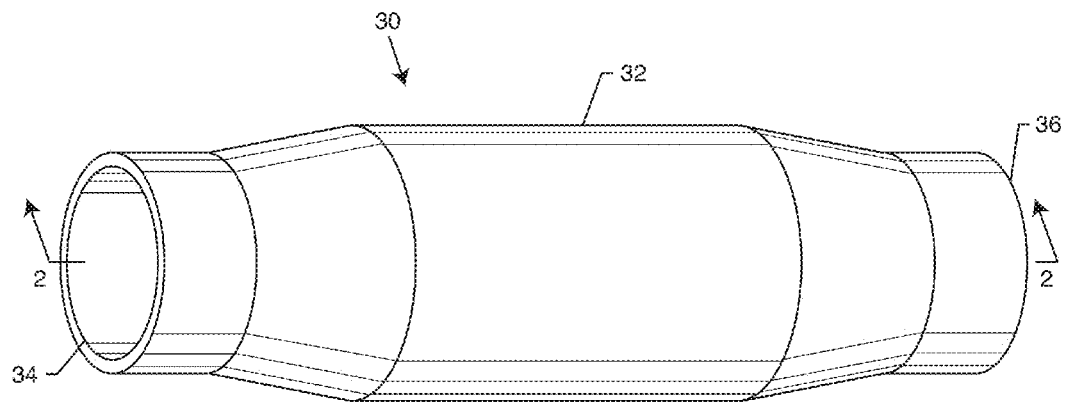
FIG. 1 is a diagram depicting a preferred embodiment of the inventive multi-stage cavitation device.

With reference to the attached drawings, a method and device for application of pressure, heat and vigorous mixing to generate changes in oil resembling cracking are disclosed. The method and device include utilization of a flow-through hydrodynamic cavitation to promote molecular rearrangements of the components and change heterogeneity and rheological parameters, which occurs in a short time and results in upgraded products.

The invention provides a process for the alteration of complex mixtures of hydrocarbons to produce rapidly stable improved products with greater efficiency and simplicity than conventional methods. Although this description contains much specificity, these should not be construed as limiting the scope of the invention but as merely providing illustrations of some of the presently preferred embodiments of the present invention offering many potential uses for the products of the present invention. Many other embodiments of the present invention are possible.

Oil is defined as a naturally occurring mixture of hydrocarbons with different molecular weights and structures. It is the most important non-renewable energy source. Most oils, unless especially treated, also contain dissolved and entrapped gases, impurities, hetero-organics, traces of metals and microorganisms. As discussed above, the conventional cracking processes and refining are expensive and energy consuming and are not suitable for non-conventional oil without its preliminary upgrading.

The present invention uses energy released during the cavitation bubble implosion to alter naturally occurring hydrocarbons in conventional oil, its fractions and non-conventional oil. Hydrodynamic cavitation involves the phenomenon of vapor bubble formation in the fluid flow experiencing reduced pressure, which is followed by bubble collapse in a restored pressure zone downstream.

The objects of the present invention are achieved by processing oil in a flow-through hydrodynamic cavitation apparatus to induce chemical reactions and to change critical physical properties of oil, such as viscosity and API gravity. Hydrodynamic cavitation assumes formation of vapor bubbles within a fluid accelerated to high velocities in a minuscule area resulting in reduced fluid pressure. In practice, fluid is accelerated either with a high-pressure pump or by reducing the available flow area at constant pressure. The phenomenon is named cavitation, because cavities form when the fluid pressure has been reduced to the vapor pressure of its constituent(s). The vapor bubbles expand as they move and suddenly collapse, reaching regions of high pressure. The violent collapse causes a tremendous jump in both localized temperature and pressure and intense shearing forces, resulting in chemical reactions. By subjecting oil to a flow-through hydrodynamic cavitation, hydrocarbon molecules are activated and are converted into smaller, lower boiling point, stable components. The cavitation is preferably performed in the presence of a powdered catalyst, i.e., Zeolyte, followed by its separation.

Intense localized heat released as a result of gas suppression and microjets, which accompany the collapse of the cavitation bubbles, excite molecules of hydrocarbon mixed vapors and in the spherical adjacent layers of surrounding condensed fluid, transiently enriched with the high-point-boiling hydrocarbons, thereby driving chemical reactions.

In practice, the process is carried out as follows: The fluid flow is fed into the reactor's channel. In its localized zone, the velocity accelerates causing the pressure in the flow to decrease (Bernoulli's principle). This results in the formation of bubbles filled with the vapors of hydrocarbons that boil at the conditions of the localized zone. When the cavitation bubbles move beyond the boundary of the localized zone, the pressure in the flow increases and the bubbles collapse, exposing the vapors of hydrocarbons found within them to localized high pressures and temperatures, shearing forces and shock waves. The collapse may also result in acoustic vibrations and electromagnetic irradiation. Each cavitation bubble serves as an independent mini-reactor, in which chemical alteration of hydrocarbons occurs. The increased pressure and temperature is significantly higher than those in any known prior art cracking process. Thus, alterations of oil ingredients and the constituents of other hydrocarbon mixtures result from the reactions taking place within and/or adjacent to areas of the collapsing bubbles.

According to the present invention, the method allows for the control of the intensity of the cavitation field by using the appropriate device design and a selected inlet pump pressure. Initially high viscosity hydrocarbon fluids can have their viscosity lowered by pre-heating, adding solvents and surfactants, applying a pulsed electric or magnetic field (Tao and Xu, 2006) or a mixture thereof. Disintegration and fragmentation of hydrocarbons will further reduce the viscosity of oil and its API gravity. The covalent bonds that connect sulfur and nitrogen atoms to carbon atoms can be broken as well, thereby allowing removal of these elements and their compounds from oil and distillate fuels.

Figure 2:
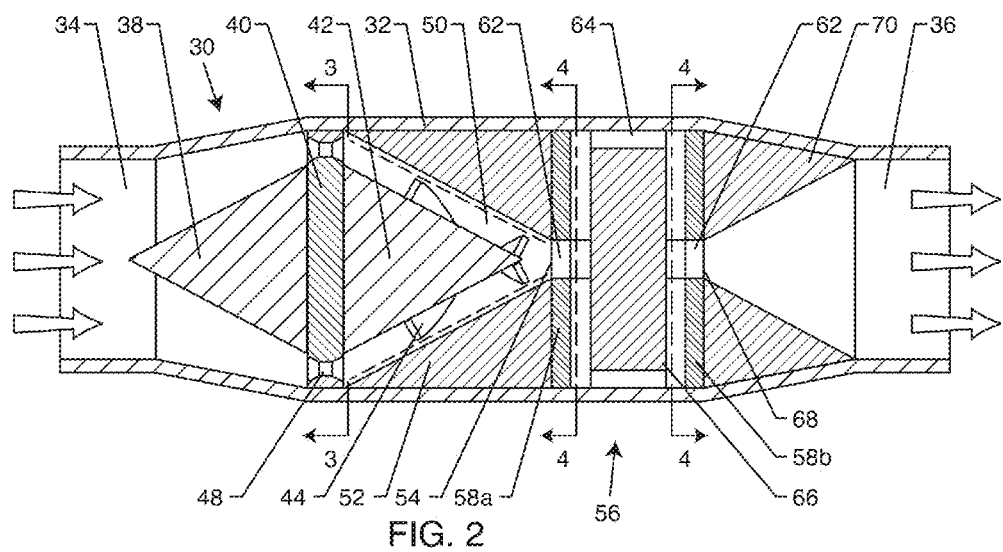
FIG. 2 is a cross-sectional view of the multi-stage cavitation device taken along line 2-2 of FIG. 1.
Figure 3:
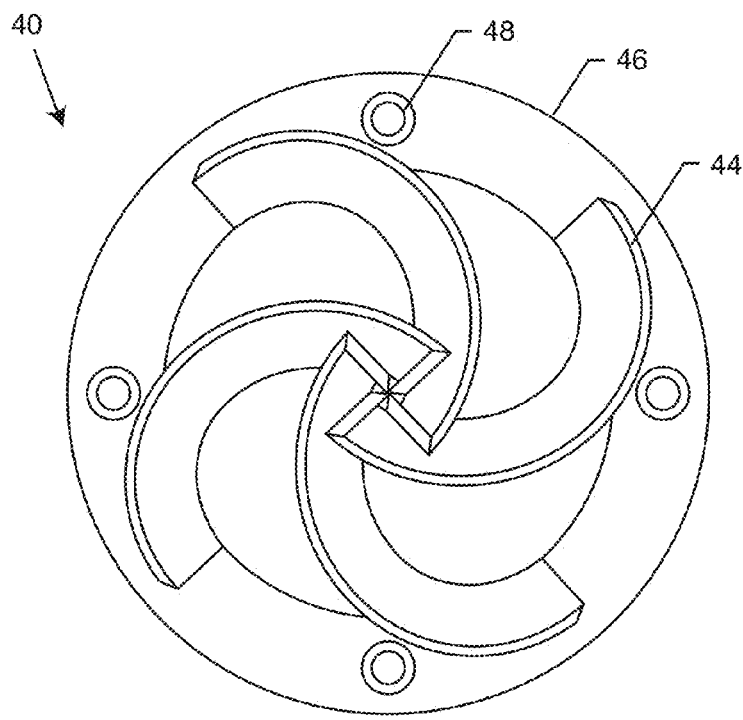
FIG. 3 is a cross-sectional view of the front end of the working chamber of the cavitation system taken along line 3-3 in FIG. 2.
Figure 4:
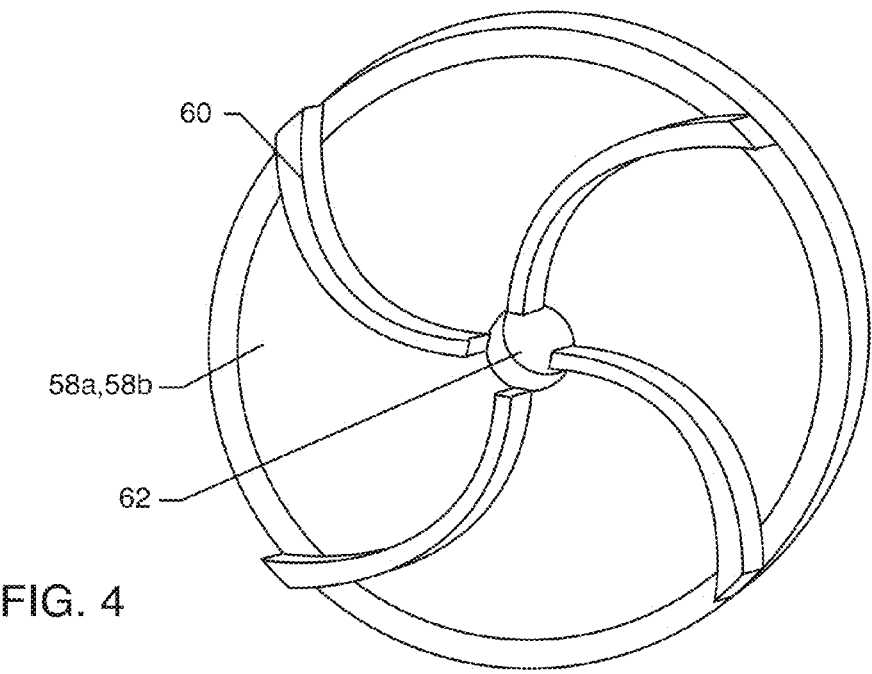
FIG. 4 is a cross-sectional view of the vortex element taken along lines 4-4 in FIG. 2.
Figure 5:
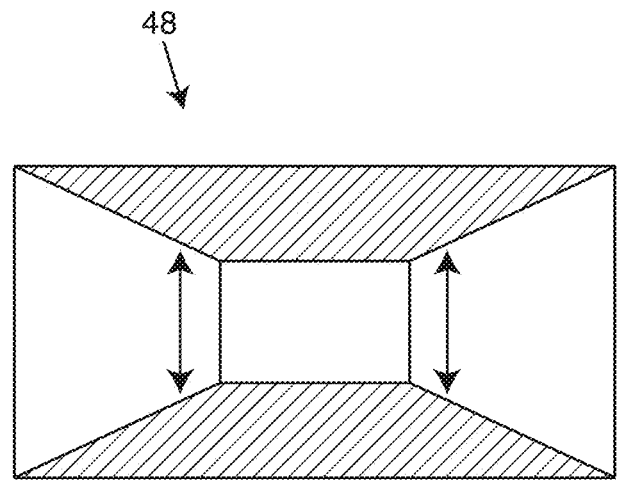
FIG. 5 is a cross-sectional view of one embodiment of a channel in a multi-jet nozzle.
Figure 6:
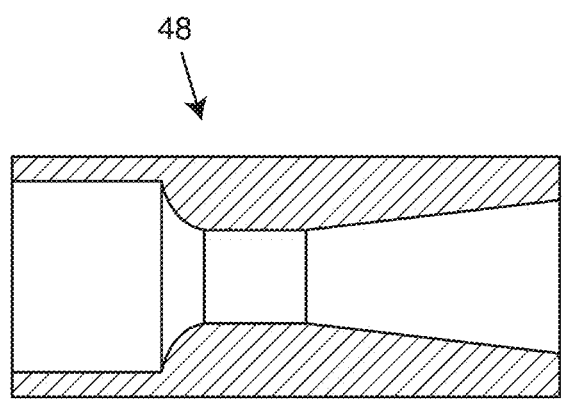
FIG. 6 is a cross-sectional view of an alternative embodiment of a channel in a multi-jet nozzle.

FIGS. 1-6 generally illustrate a first preferred embodiment of the cavitation device 30 of the present invention. This embodiment is described in co-pending U.S. patent application Ser. No. 12/359,110, the disclosure of which is incorporated herein, in its entirety. As shown in FIG. 1, the cavitation device 30 is comprised of a cylindrical body 32 made preferably of a metal, an inlet tube 34 and an outlet tube 36. An inlet cone 38 is located in front of a multi-jet nozzle 40 along the flow path. A guide cone 42 is positioned behind the nozzle 40 and features spiral guides 44. The multi-jet nozzle 40 is shaped as a disk having a perimeter ring 46 and features four channels 48 that have both across abrupt contractions and expansions (FIGS. 2 and 3). The number of spiral guides 44 is equal to the number of channels 48 in the multi-jet nozzle 40. The channels 48 have varying diameters along their lengths (FIGS. 5 and 6) and are uniformly distributed throughout the surface area of the perimeter ring 46 of the multi-jet nozzle 40 and direct flow into the working chamber 50.

The working chamber 50 is located behind the multi-jet nozzle 40 along the flow path and has an inner wall formed by the guide cone 42 and an outer wall formed by a convergent cone 52. The convergent cone 52 is co-axially aligned with the guide cone 42. An outlet 54 from the convergent cone 52 leads to a vortex chamber or generator 56, which is disposed behind the convergent cone 52. The vortex generator 56 is comprised of disks 58 with curved flow guides 60 and central holes 62 that are coaxially aligned with one another. An annular gap 64 is located between the front and rear disks 58a, 58b and around a cylinder-type body 66 of slightly smaller diameter than the vortex chamber 56 that blocks the direct path of the jet emerging from the central hole 62 in the front disk 58a. The curved flow guides 60 are raised with respect to the disks 58 so as to extend out to the cylinder type body 66.

The flow guides 60 create multiple curved flow paths from the central hole 62 in the front disk 58a to the annular gap 64 of the vortex generator 56. Similar paths are created from the annular gap 64 of the vortex chamber 56 to the central hole 36 on the rear disk 58b on the backside of the cylinder-type body 66. The central holes 36, the outlet 54 of the convergent cone 52 and an inlet 68 of the atomizing cone 70, which is situated behind the vortex generator 56 along the flow path, all have the same diameters.

The physical properties and chemical composition of complex viscous hydrocarbon fluids and dispersions are altered by the enforcement of said fluids in the multi-stage flow-through hydrodynamic cavitational reactor 30, controlling cavitation by setting inlet pump pressure, and continuing the application of such cavitation for a period of time sufficient for generating physical and chemical alterations within said fluid in the downstream zone, making desirable changes in its characteristics and obtaining the upgraded product. Fluid includes, but is not limited to a homogeneous or heterogeneous complex mixture of hydrocarbons existing in a liquid phase immediately prior to cavitation, a two-phase or multiphase system comprised of hydrocarbons and water and/or other unmixable liquids, a hydrocarbon solution of salts, gases and/or other solutes, a dispersion, an emulsion, a suspension, melted solids, gas in a supercritical condition and mixtures thereof.

In the case of oil or any other complex mixture of hydrocarbons, the composition of a cavitation bubble is not uniform. They will contain vapors of a number of hydrocarbons that are volatile under the given conditions. The implosion of the bubbles releases energy required for the chemical reactions to proceed. The processed mixture contains the products of these reactions, the newly formed stable compounds.

The size of cavitation bubbles depends on the nature of the fluid under treatment and the engineering design of the cavitational device 30 and its parameters, such as, for instance, the velocity of flow sustained by the pump. The pump pressure is increased until a proper level of cavitation is achieved. In addition to determining the size of the bubbles, and, as a consequence, the amount of released energy, the pressure will govern the reactions of the constituents. The effect of surface tension and bubble size on the hydrostatic pressure is defined as follows: $P_i=P_0+2a/R$, where $P_i$ is the hydrostatic pressure, a is the surface tension, and R is the radius of the bubble. The smaller the bubble, the greater the energy released during its implosion. One disadvantage of excessively high pressure is increased heat release, which may become important if overheating is detrimental to product quality and safety.

The faster the flow rate, the lower the cavitation number. A lower cavitation number (especially cavitation numbers below 1.0) imply a high degree of cavitation. The preferred embodiment of the present invention optimizes the cavitation to perform uniform oil alteration by applying the most suitable pump pressure selected from a range of 50-5,000 psi. Alternatively, if too much energy is applied or the treatment time is substantially increased, then the cost of upgrading goes up. By applying hydrodynamic cavitation at a pump pressure designed to cause cavitation and chemical conversion consistently throughout the liquid, the changes in properties take place and a desirable outcome is achieved.

In accordance with the present invention, oil is treated either continuously or periodically, by passing through the cavitational device 30. The device 30 can be placed anywhere around a mining site, refining column or any other facility. Yet another design possibility exists in which a flow-through hydrodynamic cavitation device 30 is fixed in position or movable. The flow-through hydrodynamic devices are designed to treat large volumes of oil at the ambient temperature and pressure. Placement of a device 30 may be combined with the placement of multiple devices. Additional lines and skid systems can be added to scale up the production capacity. These systems can be easily mounted and transported, making them suitable for production, blending, transportation and refining of oil. In practice, it is desirable to take into account the cost of the device 30, its production capability and the subsequent energy, maintenance and operation cost. It should be emphasized that an operator of the hydrodynamic cavitation device 30 is not required to wear high performance safety products for hearing protection, such as earmuffs or earplugs, as it would be in a case of high frequency cavitation.

It becomes an equipment cost decision what type of a flow-through hydrodynamic cavitation device configuration to use since a number of approaches are technically feasible, whether for large scale upgrading or treatment of small volumes. One method for ensuring the best conditions is to create cavitation evenly throughout the flow while avoiding wasting energy. Ideally, the energy applied should be lowered to an optimized level when cavitation still efficiently occurs and energy expenditure is minimal.

Figures 7, 8:
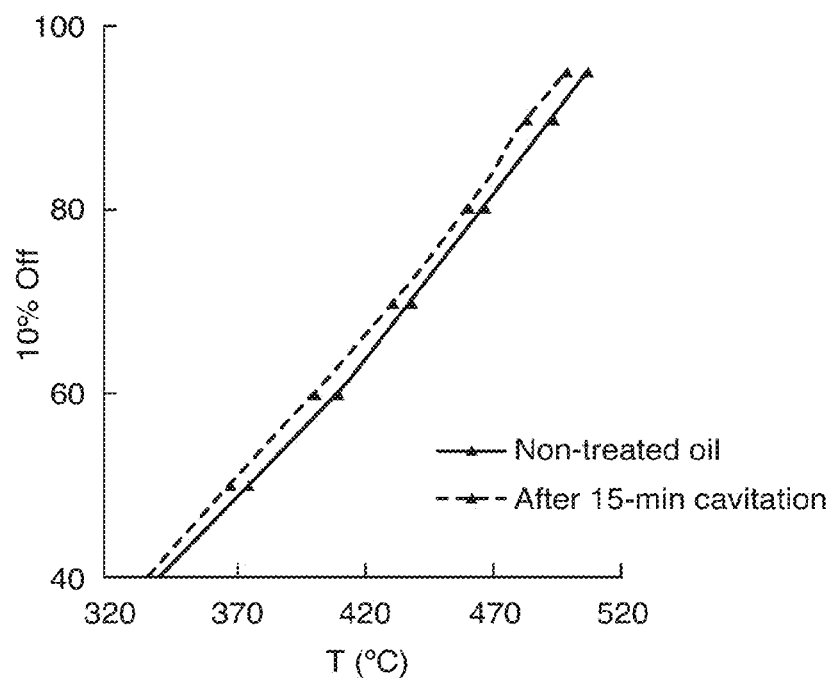
FIG. 7 is a table comparing the bromine numbers of a heavy oil both untreated and subjected to two different cavitation processes according to the claimed invention.
FIG. 8 is a graph plotting the amount boiled off against temperature of a heavy oil both untreated and after subjected to a cavitation process according to the claimed invention.

FIG. 7 is a table that compares the bromine number of heavy oil (API gravity 14.5 at 60° F.) with those of the same oil subjected to a 15-min cavitation at 80 psi pump pressure and oil mixed with water solution of citric acid (1:1) and subjected to a 15-min cavitation at 80 psi pump pressure.

Similar to conventional cracking, cavitation causes homolytic fission of carbon-carbon bonds. Alkyl chains and side chains of aromatic ring structures in heavy oil break, resulting in the absence of hydrogen in the formation of unsaturated hydrocarbons (olefins or alkenes):

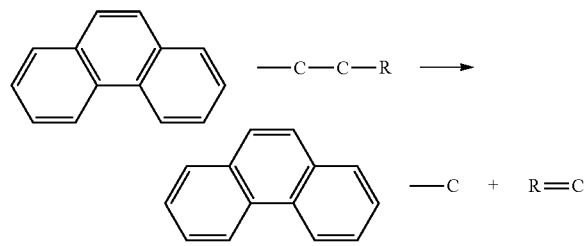

When olefins react with liquid bromine their double bonds break, a bromine atom attaches to each carbon and, as a result, bromine loses its red-brown color:

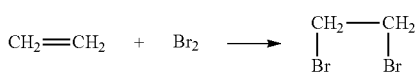

The discoloration of bromine is used as a test for a carbon-carbon double bond concentration (ASTM D1159-07: Standard test method for bromine numbers of petroleum distillates and commercial aliphatic olefins by electrometric titration).

Referring back to FIG. 4-7, the observed 5.9% increase in the double bond level indicates significant changes in the chemical structures of the cavitated oil. If hydrogen gas were available, one would observe the formation of alkanes, saturation of aromatics and deeper defragmentation. When heavy oil is cavitated in the device 30 with water to imitate steam cracking conditions the bromine number increases by 16.2%, which is consistent with olefin formation during steam cracking, but in a shorter processing time. Thus, the present invention allows for expedient production of upgraded heavy oil, generating more product over time than is possible using other cavitation technologies.

When a mixture of heavy crude oil and water is cavitated, the hydroxyl radicals that are formed because of the disruption of hydrogen bonds between molecules of water and breakage of oxygen-hydrogen covalent bonds in water oxidize sulfur in sulfur-containing hydrocarbons, thereby facilitating its removal and improving crude quality.

The present method and system achieve alteration of heavy oil through the use of a multi-stage flow-through hydrodynamic cavitation. The cavitation employed in accordance with the preferred embodiment of the present invention is achieved with a pump pressure selected from the range of approximately 50-5,000 psi. Therefore, a practical approach to the desired degree of oil upgrading is to establish a pressure that provides enough bubble implosion energy for bond splitting. The optimal pressures produce cavitation bubbles in sufficient quantities to achieve a high degree of conversion. However, as one skilled in the art would understand, different hydrocarbon mixtures require different energies obtained through cavitation in order for their alteration to occur. Any inlet pressure above 50 psi is sufficient to alter properties of heavy oil. Therefore, the range of 50-5,000 psi is in no way intended to limit the use of the present invention.

Energy released because of the bubble implosion during a flow-through hydrodynamic cavitation activates hydrocarbons forcing them to break, react and form entirely new compounds. The result is an upgraded product of higher commercial value whose components will be easier to handle, distill and separate by refining.

Metals that are contained in oils may deactivate catalysts during the refining process. Crude oil with a high content of metals should be desalted to avoid poisoning of catalysts and equipment fouling in the downstream distillation units. In the present invention, desalting can be carried out prior to or simultaneously with the cracking/modification of oil. The outcome of the cavitation-assisted cracking/modification of oil may differ from that of the preliminary washed oil and is likely to result in more variable composition of end product.

In most oil washing technologies, both water and chemical reagents are required in order to achieve the desired outcome. It is exceedingly important to completely disperse water and reagents throughout the very viscous oil, and flow-through hydrodynamic cavitation accomplishes this goal. The stability and composition of water/oil dispersions can be modulated by adding surfactants, chelating reagents, salts, exposing them to heat, an electric field and by many other means. The stability depends on the electrostatic interaction (attraction or repulsion) between the droplets and is determined by their zeta potentials. In this experiment, the addition of citric acid increased stability of water/oil emulsions through the possible formation of iron-citrate and other metal complexes and adsorption of free citrate (Gan and Liu, 2008).

FIG. 8 is a graph comparing the boiling range of non-treated heavy oil with that of the same oil subjected to a 15-min cavitation at a 80-psi inlet pressure and preliminary mixed with 10% solution of citric acid in distilled water (1:1). The tests were performed in accordance with the ASTM D2887-06a standard test method for boiling range distribution of petroleum fractions by gas chromatography. The n-alkane calibration reference covered the boiling range of 55°-538° C. (100°-1000° F.), which includes n-alkanes with a carbon chain length of C5-C44. The analysis was carried out using a Varian 3400 gas chromatograph equipped with the FID detector and J&W DB 2887 column designed especially for the ASTM D2887. As can be seen, the cavitation allows the higher yield of distillate fuels to be obtained at the same temperatures as lower yield fuels.

Figures 9, 10:
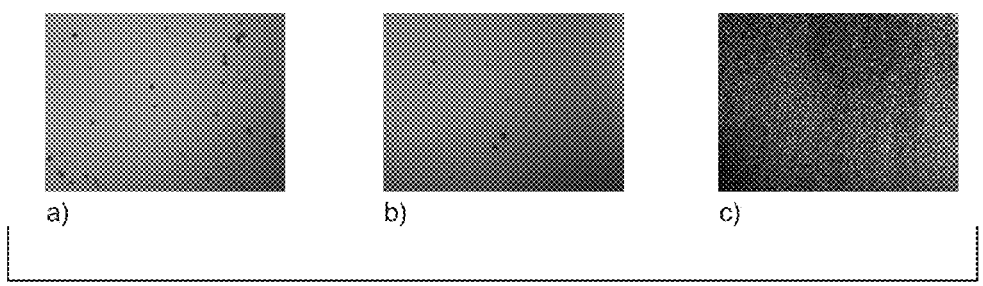
FIG. 9 is a table listing selected parameters of a heavy oil untreated and subjected to cavitation processes according to the claimed invention.
FIG. 10 depicts three optical microscope images showing oil untreated and subjected to cavitation processes according to the claimed invention.

FIG. 9 is a table that contains values for the selected characteristics of non-treated heavy oil and the same oil treated in a flow-through hydrodynamic cavitator either for 1 or 10 min to demonstrate the significant effect of this type of cavitation on the properties of non-conventional oil. It should be added that the values for the API gravity of oil has stayed within the narrow range of 16.0-16.5 for almost 2 hours when oil temperature was held at 90° F. In this example, the temperature and pressure supplied in a flow-through hydrodynamic cavitation reactor can be both immediately and effectively dispersed, thereby offering flexibility and producing upgrading without causing a detrimental effect. There is a practical limit to the use of this type of cavitation due to the amount of power needed to create it and the amount of oil that can be processed per time unit. The higher the inlet pressure, the larger the energy release during bubble implosion, but at a cost of increased energy consumption and the higher cost of the device being able to withstand such conditions.

The beneficial effects gained through the present invention cannot be achieved through rotor-stator cavitation or sonic/ultrasonic-induced cavitation because the conditions created in this process simply do not exist and cannot be duplicated by other means. In a sonic-induced process, cavitation bubbles form a barrier to transmission of and attenuate the sound waves due to their scattering and diverting properties, limiting the effective distance of the sound waves. Furthermore, the sonic/ultrasonic treatment is only capable of modifying oil at specific locations within the fluid, depending on the wavelength, interference patters and the power of the soundwave source.

The present invention overcomes these limitations, chemically and physically changing the composition of oils in a uniform manner. This invention changes the molecular structures to a greater degree, reducing the size of molecules by supplying energy sufficient to drive radical reactions. Therefore, this invention provides a better means of upgrading oil and producing mixtures of superior homogeny.

With the appropriate inlet pressure it should be possible to destroy microorganisms in a fuel that otherwise may form a harmful buildup in a storage unit or fuel tank. The cost of using cavitation in this fashion would have to be measured against the benefits gained to see if it is justified for a particular application.

It is important that the flow-through hydrodynamic cavitation is used at the proper stage. It may be preferred not to use it if possible loss of low-boiling-point hydrocarbons is an issue. While the preferred embodiment has been shown and described, it will be understood that there is no intent to limit the invention by such disclosure, but rather, is intended to cover all modifications and alternate constructions falling within the spirit and scope of the present invention.

As it can be seen from FIG. 10, the inventive method significantly improves homogeneity and dispersion of heavy oil water and water solutions, which can find numerous applications. The present invention creates beneficial conditions that cannot be duplicated. The process is enhanced by means of high pressure, elevated heat, turbulence and vigorous mixing applied simultaneously in localized zones in a flow-through cavitation device within a short period of time.

However, extreme conditions can be dangerous and detrimental. The preferred embodiments of the present invention apply optimized levels of both pressure and temperature via a controlled flow-through hydrodynamic cavitation. The process is independent of external temperatures and pressure and provides a means of changing chemical composition, physical properties and rheological characteristics of oil evenly throughout the fluid.

Important economic benefits are also experienced through implementation of the present invention. The optimized usage of a flow-through hydrodynamic cavitational reactor 30 serves to lower equipment, handling and energy costs, as it improves oil characteristics and distillate fuel yields. Although hydrogen gas may be included in the processing to terminate radical reactions and saturate double bonds, it is not necessary to upgrade oil and can be substituted with different reductants or reagents producing hydrogen in situ. Further, a flow-through hydrodynamic cavitation process does not require the use of any resident/storage container as does sonic or ultrasonic-induced cavitation.

The following examples are given for illustrating the present invention and should not be construed as limitations on the scope or spirit of the invention.

Ten liters of heavy, non-conventional non-sour oil were placed in a steel container and heated to 60° C. under continuous mixing. The oil was then subjected to the flow-through cavitation process at 80 psi pump pressure for 10 min with test samples taken for measuring temperature, API gravity, relative viscosity, concentration of unsaturated hydrocarbons and boiling range determination. The cavitated oil had a strong smell, appeared less viscous, and was processed in a fraction of the time required by conventional cracking processes.

Five hundred grams of anhydrous citric acid were dissolved in 4.5 liters of water to prepare a 10 wt. % solution. Five liters of this solution were mixed with five liters of heavy non-conventional, non-sour oil. The mixture was cavitated using the device 30. The system was allowed to stay at ambient temperature for fifteen days. No phase separation was observed. The emulsion was subjected to centrifugation at 12,000 rpm for 10 min without causing a separation. The average water droplet size was determined to be 200 nm. When heat was applied the mixture separated into a top layer of water/oil emulsion and a bottom layer of water with a volume ratio of 9:1. With regard to mixing oil with pure water, the present method provides less stable water/oil emulsions. The maximum amount was 75% water by volume.

FIG. 7 is a table comparing the bromine number of a heavy oil (API gravity is 14.5 at 60° F.) both untreated and subjected to hydrodynamic cavitation according to the present invention. The untreated heavy oil had a bromine number of 11.39. Subjecting the same heavy oil to a fifteen minute cavitation process according to the present invention increased that bromine number to 12.06, an increase of 5.9%. Mixing the original heavy oil with a chelating agent (10% solution of citric acid in distilled water) in a 1:1 ratio and then subjecting the mixture to a fifteen minute cavitation process according to the present invention increased the bromine number to 13.24, and increase of 16.2%.

FIG. 8 is a graph that compares the boiling range of non-treated heavy oil with that of the same oil subjected to a 15-min cavitation according to the present invention. The cavitated oil was pumped at 80 psi pump pressure and preliminary mixed with a 10% solution of citric acid in distilled water in a 1:1 ratio. The graph demonstrates that that cavitated oil more readily boils than the untreated oil.

FIG. 9 is a table listing selected parameters of a heavy oil untreated and subjected to cavitation processes according to the claimed invention. In general, the cavitated oil had a greater API gravity and lower boiling point as compared to the uncavitated oil.

FIG. 10 depicts three images taken with an optical microscope equipped with a digital 3-Mpix camera. The images have dimensions of 1336 microns by 1719 microns. The first image (a) show the heterogeneous composition of untreated oil. The second image (b) shows the improved homogeneity of cavitated oil. The third image (c) shows numerous water droplets in the water/oil emulsion formed after subjecting a 1:1 mixture of oil and 10% citric acid in distilled water to a 15-min cavitation at 80 psi inlet pressure according to the present invention.

FIGS. 11-21 generally illustrate a second preferred embodiment of the cavitation device 80 of the present invention. This embodiment is described in co-pending U.S. patent application Ser. No. 12/464,646, the disclosure of which is incorporated herein, in its entirety. As shown in FIG. 11, the flow-through cavitation device 80 is comprised of a housing 82, which is attached to inlet 84 and outlet 86 pipes for direct connection to an industrial pipeline (not shown). The device 80 preferably has a mirrored symmetry such that from the inlet 84 to a mid-point 88 is repeated in reverse from the mid-point 88 to the outlet 86. The following description will follow the mirrored symmetry and describe from both the inlet 84 and outlet 86 toward the mid-point 88 simultaneously.

Assuming flow from left to right, front and end disk multi-jet nozzles 90a, 90b serve as the front and back walls of exterior working chambers 92a, 92b and are located behind the inlet pipe 84 and in front of the outlet pipe 86. The multi-jet nozzles 92 are equipped with constricting and expanding channels 94 that are distributed uniformly over the surfaces of the disks that are the multi-jet nozzles 90. The working chambers 92 are comprised of radial cones 96a, 96b and central guide cones 98a, 98b, which are attached to radial multi-jet nozzles 100a, 100b. The radial multi-jet nozzles 100 feature both constricting and expanding channels 102. The channels 102 are spread evenly over the radial perimeter surface of the radial nozzles 100, which direct the flow to interior working chambers 104a, 104b.

Flow guides 106a, 106b that direct the flowpath from the perimeter to a center of the device 80 bound the chambers 104. The cross-section of the flow guides 106 generally has an S-shape configuration. A hemi-spherical body 108a, 108b with a top niche 110 is mounted in the working chambers 104 against the radial nozzles 100. The turbulizer disk 112a, 112b (FIG. 13) with curved guides 114 and central hole 116 is located behind the guides 106 in vortex chamber 118. The vortex chamber 118 is formed of the inner wall of the housing 82 and a cylindrical body 120 disposed in the center. The vortex chamber 118 directs the flow from the hole 116 of the front disk 112a. The holes 116 in the front and rear disks 112a, 112b are coaxial. Their diameters are equal to that of holes in the guides 106. The mid-point 88 is within the vortex chamber 118.

Figure 13:
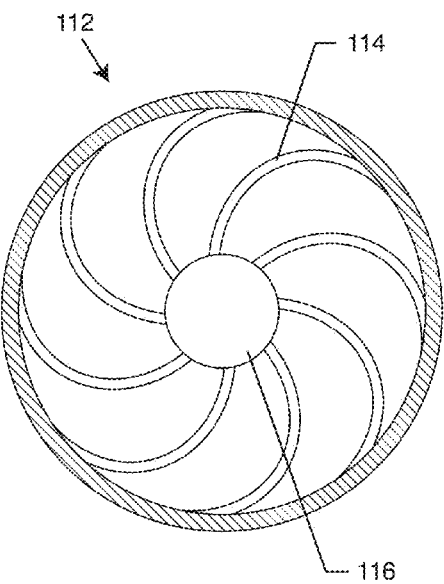
FIG. 13 is a cross-sectional view of the turbulizer disk taken along line 13-13 of FIG. 12.
Figure 14:
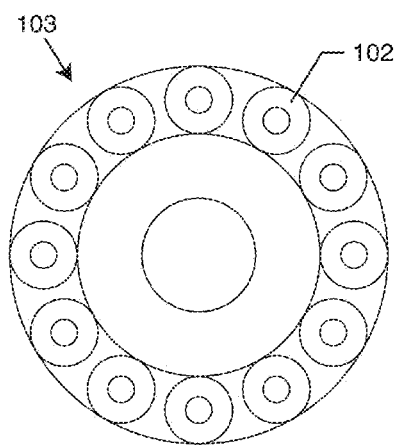
FIG. 14 is a cross-sectional view of the radial multi-jet nozzle taken along lines 14-14 of FIG. 12.
Figure 15:
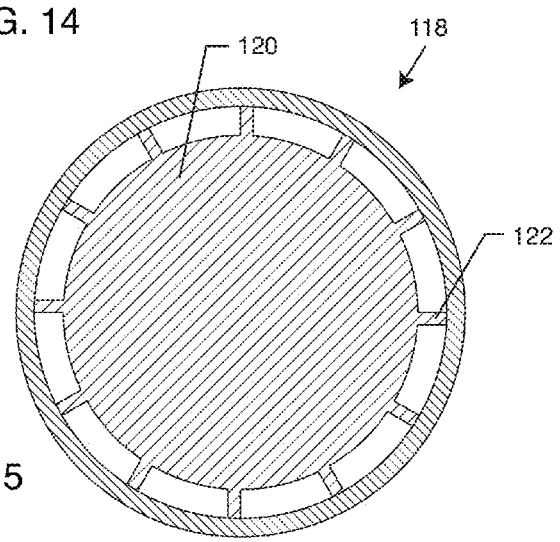
FIG. 15 is a cross-sectional view of the cylindrical body taken along lines 15-15 of FIG. 12.
Figures 16, 17:
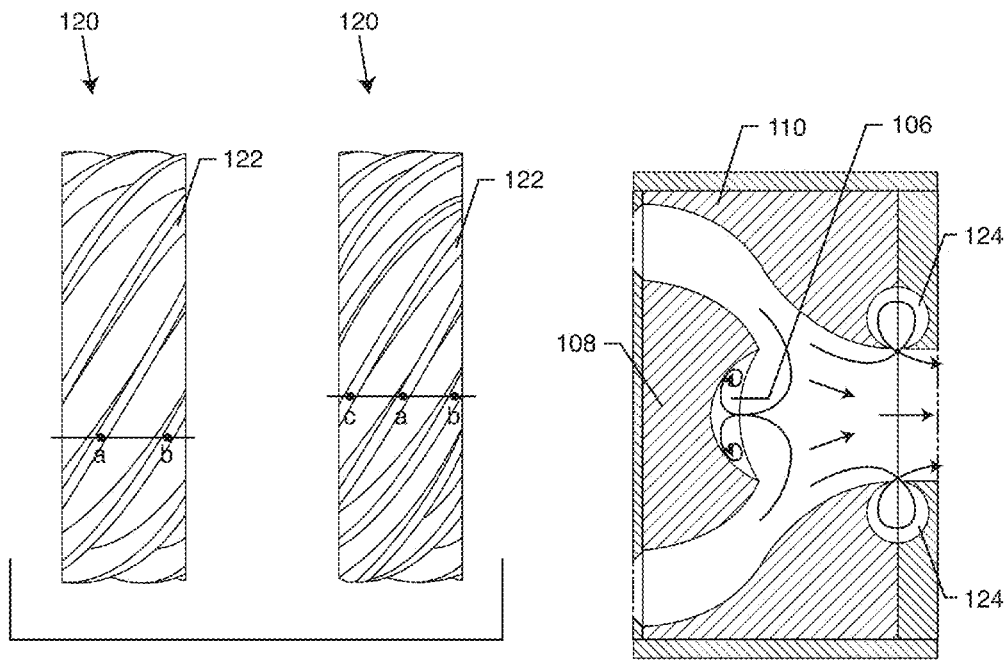
FIG. 16 is a side view of the cylindrical body.
FIG. 17 is a close-up view of the front interior working chamber and toroidal vortex chamber illustrating fluid flow.
Figures 18, 19:
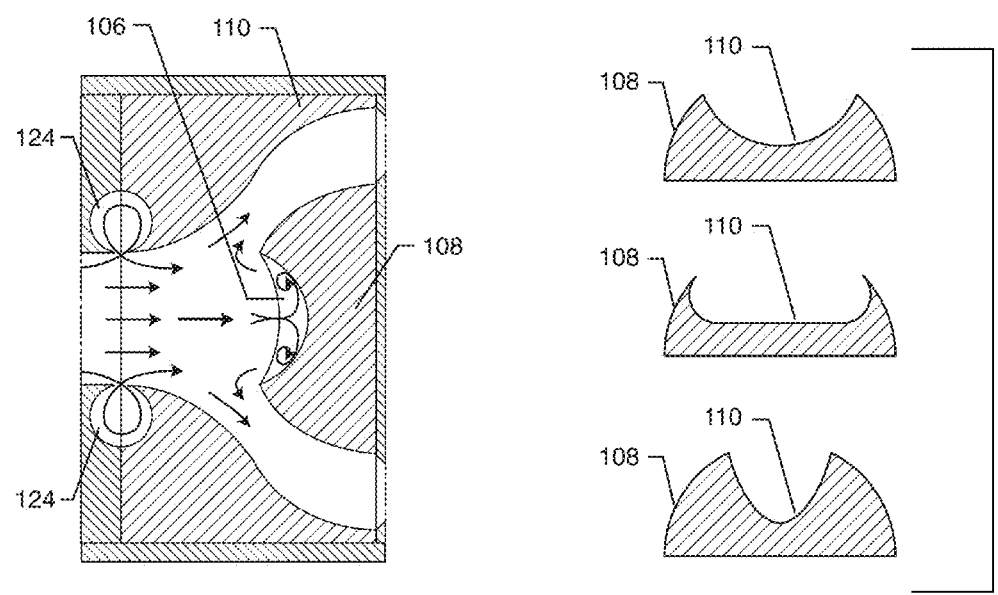
FIG. 18 is a close-up view of the back interior working chamber and toroidal vortex chamber illustrating fluid flow.
FIG. 19 is a cross-sectional view of various forms of the hemi-spherical body.

FIG. 13 is a diagram that shows disks 112a, 112b with curved guides 114 and central hole 116. An interior side of the radial multi-jet nozzles 100 is depicted in FIG. 14. The channels 102 let out into the interior working chambers 104 housing the hemi-spherical body 108 having top niche 110. FIG. 15 shows a cross-sectional view of the cylindrical body 120, which is provided with the superficial perimeter guides 122 that serve as the channels for fluid flow. FIG. 16 is a drawing of a preferred embodiment for the guides 122 of the cylindrical body 120. FIGS. 17 and 18 depict the junction between the interior working chambers 104 and the disks 112 and illustrate fluid flow therein. At the junction between the guides 106 and the disks 112 are toroidal vortex chambers 124 which are connected to the holes 116 and interior working chambers 104. FIG. 19 is a simplified schematic illustration showing various embodiments for the niche 110 in the hemispherical body 108: a hemi-sphere, a toroid, and a parabola.

Figure 20:
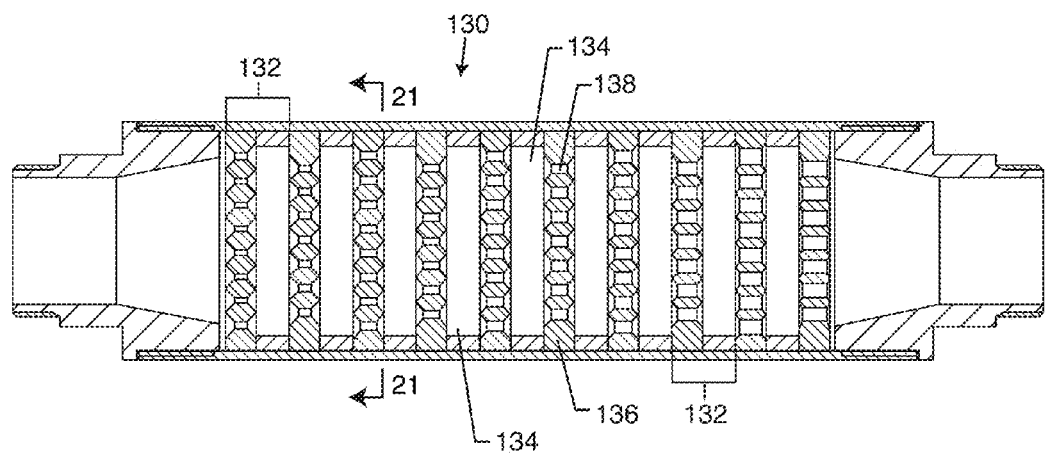
FIG. 20 is a cross-sectional view of another preferred embodiment of the multi-stage flow-through hydrodynamic cavitation device.

FIG. 20 is a drawing that illustrates another alternate embodiment for a flow-through multi-stage cavitation device 130 that provides as many as ten zones 132 for generation and collapse of cavitation bubbles and is comprised of ten identical working chambers 134 and ten multi-jet nozzles 136 that differ in respect to the cross-sectional passage areas created by their channels 138.

Figure 21:
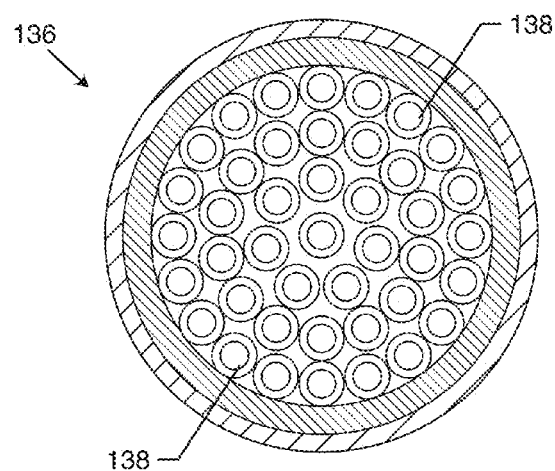
FIG. 21 is a cross-sectional view taken along line 21-21 of FIG. 20.

FIG. 21 illustrates the nozzles 136 and the channel 138 therein. The total cross-sectional channel area ($S_n$) of each multi-jet nozzle is less than that of the next multi-jet nozzle ($S_{n+1}$) following the flowpath, according to the equation: $1.0\delta \leq S_{n+1}/S_n \leq 1.1$, where n=1, 2, 3, 4, 5, 6, 7, 8 or 9. This helps save energy required for pumping a fluid flow through the multi-zone cavitation system. To scale back the cavitation device parts, for example, the multi-jet nozzle 136, it is necessary to place the channels 138 for fluid passage as close as possible. The number of the channels 138 of the multi-jet nozzle 136 is limited by the ratio of the total area of the largest cross-sectional openings of the channels ($S_d$) to the surface area of the multi-jet nozzle ($S_D$): $S_d/S_D \leq 0.8$, where $$S_d = \sum_{i=1}^{k} S_i$$

(k is the number of channels of the multi-jet nozzle; $S_i = \pi d_i^2/4$, where $d_i$ is the largest diameter of the channels I, and $S_D = \pi D^2/4$, where D is the multi-jet nozzle diameter.

Various detailed embodiments of a cavitation device 30, 80, 100 of the present invention are disclosed herein. Any one of these described embodiments are capable of achieving the stated results for the modification of crude oil using the inventive process as described herein. However, it should be understood, that the disclosed embodiments are merely exemplary of the cavitation device, which may be embodied in various forms. Therefore, the details disclosed herein are not to be interpreted as limiting, but merely as the basis for the claims and as a basis for teaching one skilled in the art how to make and use the present invention.

Although several embodiments have been described in detail for purposes of illustration, various modifications may be made without departing from the scope and spirit of the invention.

What is claimed is:

1. A process for modification of crude oil, comprising the steps of:
   combining crude oil with water and a catalyst to create a fluidic mixture;
   pumping the fluidic mixture through contractions in each of a plurality of localized zones in a flowpath in a static, multi-stage, flow-through, hydrodynamic cavitation device having a single inlet and a single outlet, wherein each of the plurality of localized zones corresponds to a separate stage;
   generating areas of reduced fluid pressure in the fluidic mixture as it is pumped through the contractions in each of the plurality of localized zones in the flowpath, such contractions resulting in increased flow velocity and reduced fluid pressure;
   creating cavitational features of volatile components in the fluidic mixture resulting from areas of reduced fluid pressure, wherein the volatile components form vapors at the reduced fluid pressure;
   collapsing the cavitational features in the fluidic mixture as it leaves each of the plurality of localized zones exposing components of the fluidic mixture to sudden, localized increases in temperature and pressure;
   mixing vapors of the volatile components with adjacent layers of less volatile components in a condensed fluidic mixture upon collapse of the cavitational features; and
   inducing chemical reactions between the vapors of the volatile components and less volatile components to promote molecular rearrangement of the components of the fluidic mixture and modify rheological parameters of the crude oil.

2. The process of claim 1, wherein the fluidic mixture is pumped at a controlled inlet pressure approximating ambient pressure.

3. The process of claim 1, wherein the flowpath has a series of chambers with varying diameters and static elements to create sudden reductions in fluid pressure.

4. The process of claim 1, wherein the cavitational features comprise cavitation bubbles containing vapors of volatile components in the fluidic mixture.

5. The process of claim 1, wherein the rheological parameters include viscosity, API gravity, and heterogeneity.

6. The process of claim 1, further comprising the step of pumping the fluidic mixture through multiple cavitation devices arranged in series and/or parallel.

7. The process of claim 1, wherein the crude oil comprises bitumen, asphalt, maltenes or petroleum heavy crude and the catalyst comprises a zeolite or an acid.

8. The process of claim 1, further comprising the step of combining the crude oil with solvents and/or surfactants to lower the viscosity of the crude oil.

9. The process of claim 1, further comprising the step of applying a pulsed electrical or magnetic field to the crude oil to lower the viscosity of the crude oil.

10. The process of claim 1, further comprising the step of pre-heating the fluidic mixture to lower the viscosity of the fluidic mixture.

11. The process of claim 1, further comprising the step of exposing the fluidic mixture to UV light irradiation or sonic irradiation before, during or after the creation of the cavitational features.

12. A process for modification of crude oil, comprising the steps of:
   combining crude oil with water and a catalyst to create a fluidic mixture;
   providing a static, multi-stage, flow-through, hydrodynamic cavitation device having a flowpath with a single inlet and a single outlet, the flowpath comprising a series of chambers with varying diameters and static elements, each chamber corresponding to one of a plurality of localized zones, each including a contraction of the flowpath;
   pumping the fluidic mixture through contractions in the flowpath, wherein the fluidic mixture is pumped at a controlled inlet pressure;
   generating areas of reduced fluid pressure in the fluidic mixture as it is pumped through the contractions in each of the plurality of localized zones in the flowpath, such contractions resulting in increased flow velocity and reduced fluid pressure;
   creating cavitational features of volatile components in the fluidic mixture resulting from the areas of reduced fluid pressure, wherein the volatile components form vapors at the reduced fluid pressure;
   collapsing the cavitational features as the fluidic mixture leaves each of the plurality of localized zones exposing components of the fluidic mixture to sudden, localized increases in temperature and pressure;
   mixing vapors of the volatile components with adjacent layers of condensed fluidic mixture transiently enriched with less volatile components of the fluidic mixture upon collapse of the cavitational features; and
   inducing chemical reactions between the vapors of the volatile components and the less volatile components to promote molecular rearrangement of the components of the fluidic mixture and modify rheological parameters of the fluidic mixture.

13. The process of claim 12, wherein the rheological parameters include viscosity, API gravity, and heterogeneity.

14. The process of claim 12, further comprising the step of pumping the fluidic mixture through multiple cavitation devices arranged in series and/or parallel.

15. The process of claim 12, wherein the crude oil comprises bitumen, asphalt, maltenes or petroleum heavy crude and the catalyst comprises a zeolite or an acid.

16. The process of claim 12, further comprising the step of combining the fluidic mixture with solvents and/or surfactants to lower the viscosity of the fluidic mixture.

17. The process of claim 12, further comprising the step of applying a pulsed electrical or magnetic field to the fluidic mixture to lower the viscosity of the fluidic mixture.

18. The process of claim 12, further comprising the step of pre-heating the fluidic mixture to lower the viscosity of the fluidic mixture.

19. The process of claim 12, further comprising the step of exposing the fluidic mixture to UV light irradiation or sonic irradiation before, during or after the creation of the cavitational features.

* * * * *